United States Patent
Shekhara

(10) Patent No.: US 8,542,903 B2
(45) Date of Patent: Sep. 24, 2013

(54) METHOD AND SYSTEM FOR DELINEATION OF VASCULATURE

(75) Inventor: Raja Shekhara, Bangalore (IN)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 12/547,714

(22) Filed: Aug. 26, 2009

(65) Prior Publication Data
US 2010/0054573 A1    Mar. 4, 2010

(30) Foreign Application Priority Data
Aug. 27, 2008 (IN) .............. 2085/CHE/2008

(51) Int. Cl.
*G06K 9/00* (2006.01)
(52) U.S. Cl.
USPC .............................................. 382/132
(58) Field of Classification Search
USPC ................... 382/132; 600/407, 425
See application file for complete search history.

(56) References Cited

U.S. PATENT DOCUMENTS

| 2005/0004446 A1* | 1/2005 | Cowan et al. ............ 600/407 |
| 2005/0113679 A1* | 5/2005 | Suryanarayanan et al. .. 600/425 |
| 2005/0157917 A1 | 7/2005 | Saptharishi et al. |

* cited by examiner

*Primary Examiner* — John Pauls
(74) *Attorney, Agent, or Firm* — Global Patent Operation; Marc A. Vivenzio

(57) ABSTRACT

A method for automatically delineating image data corresponding to vasculature in an anatomical region is presented. The method includes obtaining image data corresponding to soft tissue representative of the anatomical region. In addition, the method includes segmenting image data corresponding to a region of interest from image data corresponding to the anatomical region based on a patient population to obtain image data corresponding to a segmented region of interest. Furthermore, the method includes extracting image data corresponding to vasculature associated with the segmented region of interest by suppressing image data corresponding to soft tissue representative of the segmented region of interest. Systems and computer-readable medium that afford functionality of the type defined by this method are also contemplated in conjunction with the present technique.

9 Claims, 13 Drawing Sheets

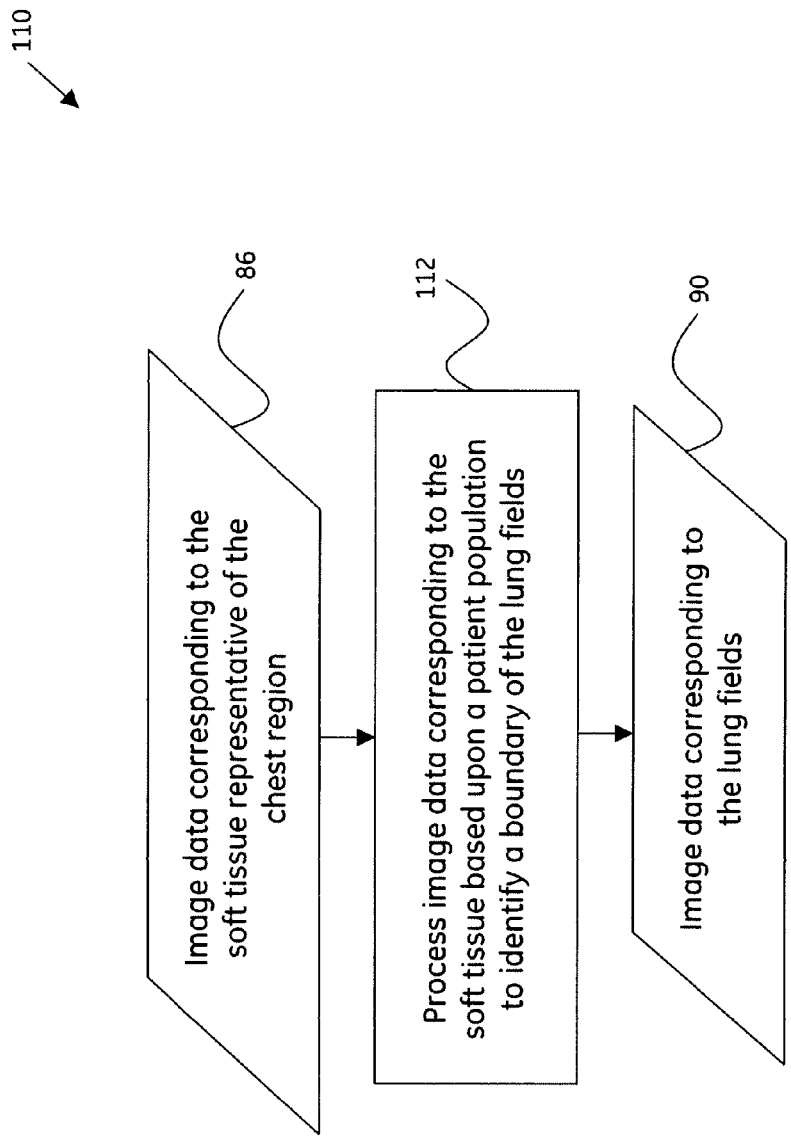

| Parameter | Large adult patient | Medium adult patient | Small adult patient | Pediatric patient |
|---|---|---|---|---|
| No scales | 5 | 5 | 6 | 8 |
| Orientations | 6 | 5 | 5 | 8 |
| Smallest filter wavelength | 3 | 3 | 3 | 3 |
| Scaling ratio | 1.25 | 1.25 | 1.25 | 1.25 |
| Deviation ratio | 0.50 | 0.60 | 0.65 | 0.68 |
| Orientation deviation ratio | 1.2 | 1.2 | 1.2 | 1.2 |
| Noise threshold | 10.0 | 15.0 | 20.0 | 25.0 |

FIG. 8

METHOD AND SYSTEM FOR DELINEATION OF VASCULATURE

CROSS-REFERENCE TO RELATED APPLICATIONS

This application claims priority under 35 U.S.C. §119(a)-(d) or (f) to prior-filed, co-pending Indian patent application number 2085/CHE/2008, filed on Aug. 27, 2008, which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The subject matter disclosed herein relates generally to methods and apparatus for review of medical imaging exams, and more particularly to methods and apparatus for delineation of vasculature in a region of interest in an anatomical region of a patient.

2. Description of Related Art

Blood vessels in the vasculature typically aid in the transportation of blood to various parts of the body. However, when a large artery in the vasculature is blocked by blood clots or other particles, the amount of blood supplied to the tissue may be insufficient, eventually causing tissue to die. For example, the presence of plaque restricts blood flow, damages the blood vessel wall and and/or promotes blood clot formation. In addition, calcification of blood vessels occurs where lipids accumulate in the blood vessel wall leading to hardening of the arteries. Also, an embolus in a blood vessel may cause severe dysfunction of an organ, which may be fatal if undiagnosed and/or untreated. For instance, blockage of the internal carotid artery may reduce blood supply to the brain, causing a stroke. Additionally, the function of the arteries in the lungs is to carry enough blood containing oxygen and nutrients to keep the lung tissue healthy and to carry carbon dioxide to the lungs for removal from the body. However, when a pulmonary artery is blocked by an embolus, plaque or calcification, the amount of blood supplied to the lung tissue may be insufficient, eventually causing tissue to die. Hence, it may be desirable to delineate vasculature in an anatomical region from surrounding background to aid in enhanced detection of disease states, if any.

Traditionally, an X-ray radiograph has been employed as a diagnostic tool for the purpose of detecting disease in humans. By way of example, a chest X-ray radiograph may be employed to aid a clinician in the detection of disease in the lungs. As noted hereinabove, it may be desirable to delineate vasculature in an anatomical region to enhance ease of detection and/or diagnosis of disease states. For example, it may be desirable to delineate vasculature in the lungs from the surrounding background to aid in the detection of any disease states in the lungs of the patient. However, delineation and reconstruction of curvilinear pulmonary vascular structures generally pose a greater challenge to image segmentation algorithms largely due to the fact that the sensitivity and selectivity of a single energy X-ray radiograph is arguably low for the extraction of vascular tree. Moreover, the pulmonary vasculature or vascular tree is known to be inherently complex with elongated shapes and multiple branches. In addition, given the microscopic distribution of pulmonary vascular structures, extraction of these vessels is a difficult and onerous task due to significant overlap of rib structures, which results in background noise and irregular shape detection. Furthermore, this low energy level of the chest X-ray radiograph may disadvantageously lead to missed detection of disease states, as it is difficult to identify a suspicious area in an extensive amount of data. In addition, confusion caused by branching points in the vasculature, veins, motion artifacts, partial volume and other pathologies may lead to misdiagnosis.

It may therefore be desirable to develop a robust technique and system for delineation of vasculature from the surrounding background that advantageously facilitates substantially superior detection of disease states in the vasculature, while simultaneously maintaining the number of false-positives to a minimum. In particular, there is a need for a system that is configured to facilitate the delineation of image data representative of pulmonary vasculature using digital X-ray image data, thereby enhancing ease of detecting disease states in the pulmonary vasculature and simplifying the clinical workflow of the diagnostic imaging system.

BRIEF SUMMARY OF THE INVENTION

In accordance with aspects of the present technique, a method for automatically delineating image data corresponding to vasculature in an anatomical region is presented. The method includes obtaining image data corresponding to soft tissue representative of the anatomical region. In addition, the method includes segmenting image data corresponding to a region of interest from image data corresponding to the anatomical region based on a patient population to obtain image data corresponding to a segmented region of interest. Furthermore, the method includes extracting image data corresponding to vasculature associated with the segmented region of interest by suppressing image data corresponding to soft tissue representative of the segmented region of interest. Computer-readable medium that afford functionality of the type defined by this method is also contemplated in conjunction with the present technique.

In accordance with yet another aspect of the present technique, a method for automatically delineating image data corresponding to vasculature in an anatomical region is presented. The method includes obtaining digital X-ray image data representative of an anatomical region in a patient. Further, the method includes obtaining image data corresponding to soft tissue representative of the anatomical region. Additionally, the method includes segmenting image data corresponding to a region of interest from image data corresponding to the anatomical region based on a patient population to obtain image data corresponding to a segmented region of interest. The method also includes extracting image data corresponding to vasculature associated with the segmented region of interest by suppressing image data corresponding to soft tissue representative of the segmented region of interest.

In accordance with further aspects of the present technique, an imaging system is presented. The system includes an acquisition subsystem configured to acquire image data, where the image data is representative of an anatomical region. Additionally, the system includes a processing subsystem in operative association with the acquisition subsystem and including a delineation platform configured to obtain image data corresponding to soft tissue representative of the anatomical region, segment image data corresponding to a region of interest from image data corresponding to the anatomical region based on a patient population to obtain image data corresponding to a segmented region of interest, and extract image data corresponding to vasculature associated with the segmented region of interest by suppressing image data corresponding to soft tissue representative of the segmented region of interest.

BRIEF DESCRIPTION OF THE SEVERAL VIEWS OF THE DRAWINGS

These and other features, aspects, and advantages of the present invention will become better understood when the following detailed description is read with reference to the accompanying drawings in which like characters represent like parts throughout the drawings, wherein:

FIG. 5 is a flow chart illustrating an exemplary process of segmenting soft tissue to obtain lung fields, in accordance with aspects of the present technique;

FIG. 8 is a table of patient parameters, in accordance with aspects of the present technique.

DETAILED DESCRIPTION OF THE INVENTION

As will be described in detail hereinafter, a method for automatically delineating image data representative of vasculature in an anatomical region and a system for automatically delineating image data representative of vasculature in the anatomical region configured to optimize detection of disease in the vasculature and simplify clinical workflow in a diagnostic imaging system, are presented. Employing the method and system described hereinafter, the system for the delineation of image data representative of vasculature may be configured to facilitate substantially superior detection of disease in the vasculature, thereby simplifying the clinical workflow of the detection of disease states.

Although, the exemplary embodiments illustrated hereinafter are described in the context of a medical imaging system, it will be appreciated that use of the diagnostic system in industrial applications are also contemplated in conjunction with the present technique.

Figure 1:
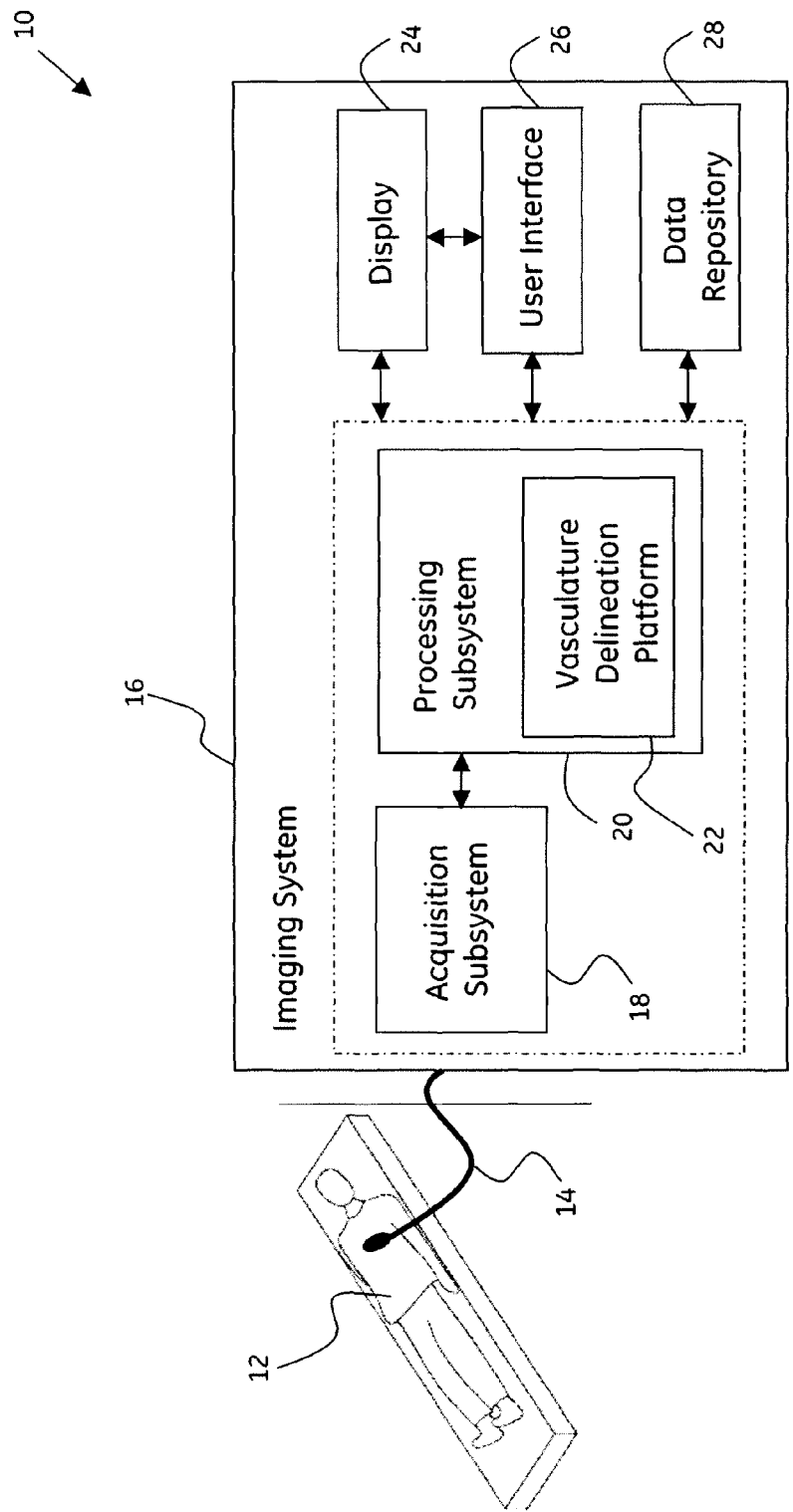
FIG. 1 is a block diagram of an exemplary diagnostic system, in accordance with aspects of the present technique.

FIG. 1 is a block diagram of an exemplary system 10 for use in diagnostic imaging, in accordance with aspects of the present technique. The system 10 may be configured to acquire image data from a patient 12 via an image acquisition device 14. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the patient 12. By way of example, the sensors may include physiological sensors (not shown) such as electrocardiogram (ECG) sensors and/or positional sensors such as electromagnetic field sensors or inertial sensors. These sensors may be operationally coupled to a data acquisition device, such as an imaging system, via leads (not shown), for example. Alternatively, the image acquisition device 14 may include detectors, in certain other embodiments.

The system 10 may also include a medical imaging system 16 that is in operative association with the image acquisition device 14. It should be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Additionally, the exemplary embodiments illustrated and described hereinafter may find application in multi-modality imaging systems that employ X-ray imaging in conjunction with other imaging modalities, position-tracking systems or other sensor systems. Furthermore, it should be noted that although the exemplary embodiments illustrated hereinafter are described in the context of a medical imaging system, such as, but not limited to, an X-ray imaging system, a magnetic resonance (MR) imaging system, or a computed tomography (CT) imaging system, other imaging systems are also contemplated in accordance with aspects of the present technique.

In a presently contemplated configuration, the medical imaging system 16 may include an acquisition subsystem 18 and a processing subsystem 20. Further, the acquisition subsystem 18 of the medical imaging system 16 may be configured to acquire image data representative of one or more anatomical regions in the patient 12 via the image acquisition device 14. The image data acquired from the patient 12 may then be processed by the processing subsystem 20.

Additionally, the image data acquired and/or processed by the medical imaging system 16 may be employed to aid a clinician in identifying disease states, assessing need for treatment, determining suitable treatment options, and/or monitoring the effect of treatment on the disease states. In certain embodiments, the processing subsystem 20 may be further coupled to a storage system, such as a data repository 28, where the data repository 28 may be configured to receive and store image data.

In accordance with exemplary aspects of the present technique, the processing subsystem 20 may include a vasculature delineation platform 22 that is configured to aid in the delineation of vasculature in an anatomical region of the patient 12 based on a patient population. It may be noted that as used herein, the terms delineating vasculature in an anatomical region may be used to refer to delineation of image data representative of the vasculature in the anatomical region from image data representative of the anatomical region. The patient population may include patients of different patient types, where the patient types may include a large adult patient, a medium patient adult, a small adult patient, or a pediatric patient. In other words, the vasculature delineation platform 22 may be configured to facilitate delineation of the vasculature in an anatomical region from the surrounding background employing images and/or image data acquired via the medical imaging system 16 and will be described in greater detail with reference to FIGS. 3-9. More particularly, the vasculature delineation platform 22 may be configured to facilitate delineation of the vasculature in the anatomical region from the surrounding background employing digital X-ray image data representative of the anatomical region that may be acquired via the medical imaging system 16. This delineation of the vasculature may be used to aid in the detection of disease states, if any, in the anatomical region of the patient. 12. The disease states may include obstructions such as blockages of the vasculature such as, but not limited to, an embolus, calcification, plaque, or a combination thereof. By way of example, the vasculature delineation platform 22 may be configured to extract pulmonary vasculature employing digital X-ray image data that is representative of the chest region of the patient 12.

In accordance with further aspects of the present technique, the imaging system 16 and more particularly, the vasculature delineation platform 22 may also be configured to use an X-ray radiograph representative of an anatomical region to facilitate delineation of corresponding vasculature. By way of example, a chest X-ray radiograph may be used to aid in the delineation of pulmonary vasculature. However, it may be noted that it may be desirable to digitize the chest X-ray radiograph prior to use by the vasculature delineation platform 22. It may also be desirable to preprocess the data apriori.

Further, as illustrated in FIG. 1, the medical imaging system 16 may include a display 24 and a user interface 26. However, in certain embodiments, such as in a touch screen, the display 24 and the user interface 26 may overlap. Also, in some embodiments, the display 24 and the user interface 26 may include a common area. In accordance with aspects of the present technique, the display 24 of the medical imaging system 16 may be configured to display an image generated by the medical imaging system 16 based on the image data acquired via the image acquisition device 14. Additionally, in accordance with further aspects of the present technique, the extracted vasculature that has been delineated by the vasculature delineation platform 22 may also be visualized on the display 24.

In addition, the user interface 26 of the medical imaging system 16 may include a human interface device (not shown) configured to facilitate the clinician in manipulating image data displayed on the display 24. The human interface device may include a mouse-type device, a trackball, a joystick, a stylus, or a touch screen configured to aid the clinician in the identification of the one or more regions of interest, for instance. However, as will be appreciated, other human interface devices, such as, but not limited to, a touch screen, may also be employed. Furthermore, in accordance with aspects of the present technique, the user interface 26 may be configured to aid the clinician in navigating through the images acquired by the medical imaging system 16. Additionally, the user interface 26 may also be configured to aid in manipulating and/or organizing the delineated vasculature displayed on the display 24.

It may be noted that although the vasculature delineation platform 22 is described as being configured to aid in the extraction of vasculature in an anatomical region using a digital X-ray image or image data representative of that anatomical region, other images, such as, but not limited to, axial slices obtained via use of other imaging systems may also be used by the vasculature delineation platform 22 to facilitate delineation of the associated vasculature.

Figure 2:
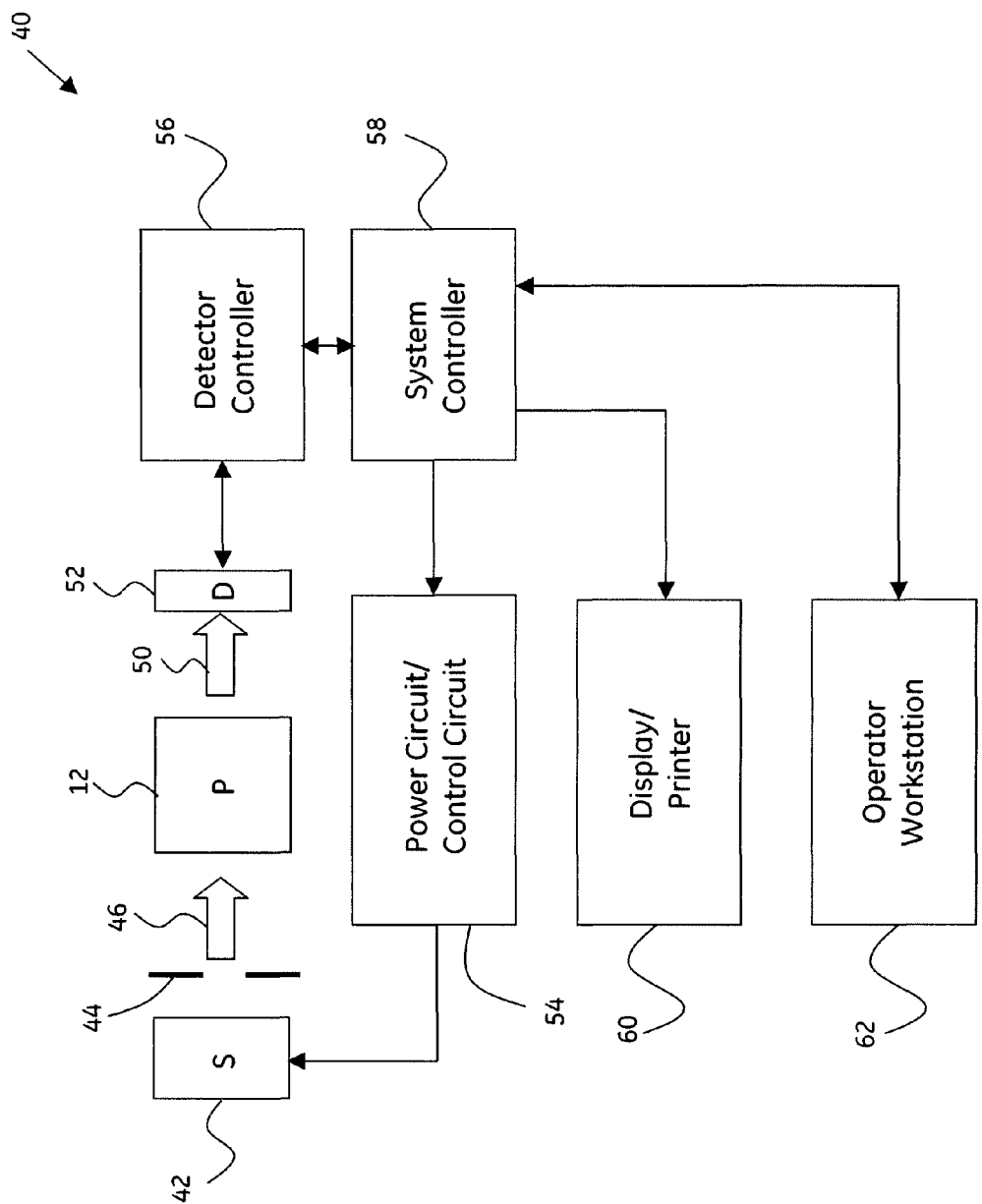
FIG. 2 is a block diagram of an exemplary imaging system in the form of an X-ray imaging system for use in the exemplary diagnostic system of FIG. 1.

As previously noted with reference to FIG. 1, the medical imaging system 16 may include an X-ray imaging system. FIG. 2 is a block diagram showing an imaging system 40 for acquiring and processing image data in accordance with the present technique. In the illustrated embodiment, the system 40 is an X-ray system designed to acquire X-ray projection data, to reconstruct the projection data into an image, and to process the image data for display and analysis in accordance with the present technique. Furthermore, in the embodiment illustrated in FIG. 2, the imaging system 40 is shown as including a source of X-ray radiation 42 positioned adjacent to a collimator 44. In one exemplary embodiment, the source of X-ray radiation 42 may include an X-ray tube. The collimator 44 may be configured to permit a stream of radiation 46 to pass into a region in which a subject, such as a human patient 12 (see FIG. 1), is positioned. A portion of the radiation 50 passes through or around the subject 12 and impacts a digital X-ray detector, represented generally at reference numeral 52. As will be appreciated, the detector 52 may be configured to convert the X-ray photons received on its surface to lower energy photons, and subsequently to electric signals which are acquired and processed to reconstruct an image of the features within the subject 12.

Moreover, the source 42 is controlled by a power supply/control circuit 54 which furnishes both power and control signals for examination sequences. In addition, the detector 52 may be coupled to a detector controller 56 which commands acquisition of the signals generated in the detector. The detector controller 56 may also execute various signal processing and filtration functions, such as for initial adjustment of dynamic ranges, interleaving of digital image data, and so forth. It may be noted that both the power supply/control circuit 54 and the detector controller 56 are responsive to signals from a system controller 58. In general, the system controller 58 may be configured to command operation of the imaging system 40 to execute examination protocols and to process acquired image data. In the present context, the system controller 58 may also include signal processing circuitry, typically based upon a general purpose or application-specific digital computer, associated memory circuitry for storing programs and routines executed by the computer, as well as configuration parameters and image data, interface circuits, and so forth.

Additionally, in the embodiment illustrated in FIG. 2, the system controller 58 is shown as being coupled to at least one output device, such as a display or printer as indicated at reference numeral 60. The output device may include standard or special purpose computer monitors and associated processing circuitry. One or more operator workstations 62 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the imaging system via one or more configurable networks, such as the Internet, virtual private networks, and so forth. Further, in one embodiment, the output device 60 may include the display 24 (see FIG. 1). Additionally, the operator workstation 62 may include the user interface 26 (see FIG. 1), in certain embodiments.

Figure 3:
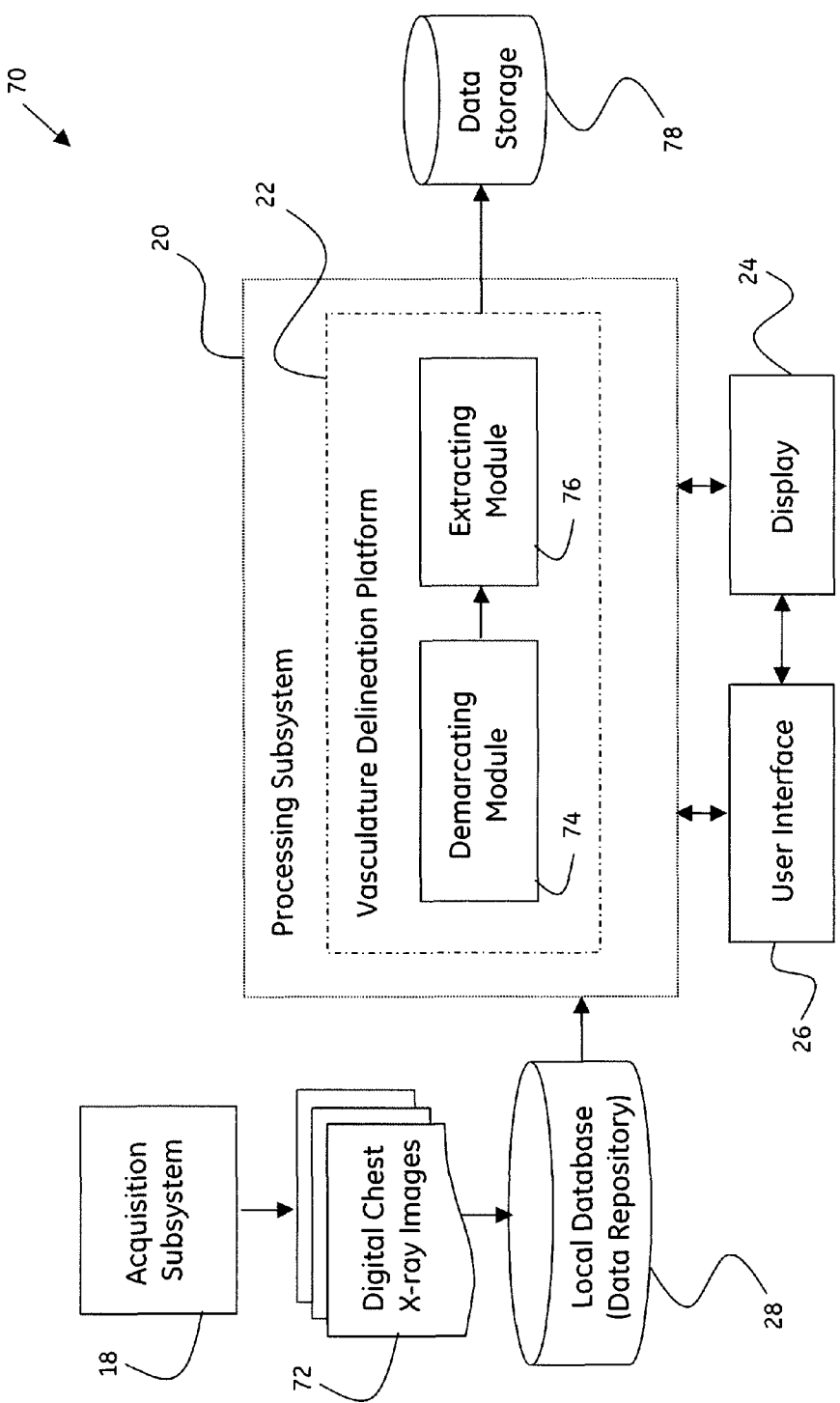
FIG. 3 is a block diagram of an exemplary vasculature delineation subsystem, in accordance with aspects of the present technique.
Figure 4A:
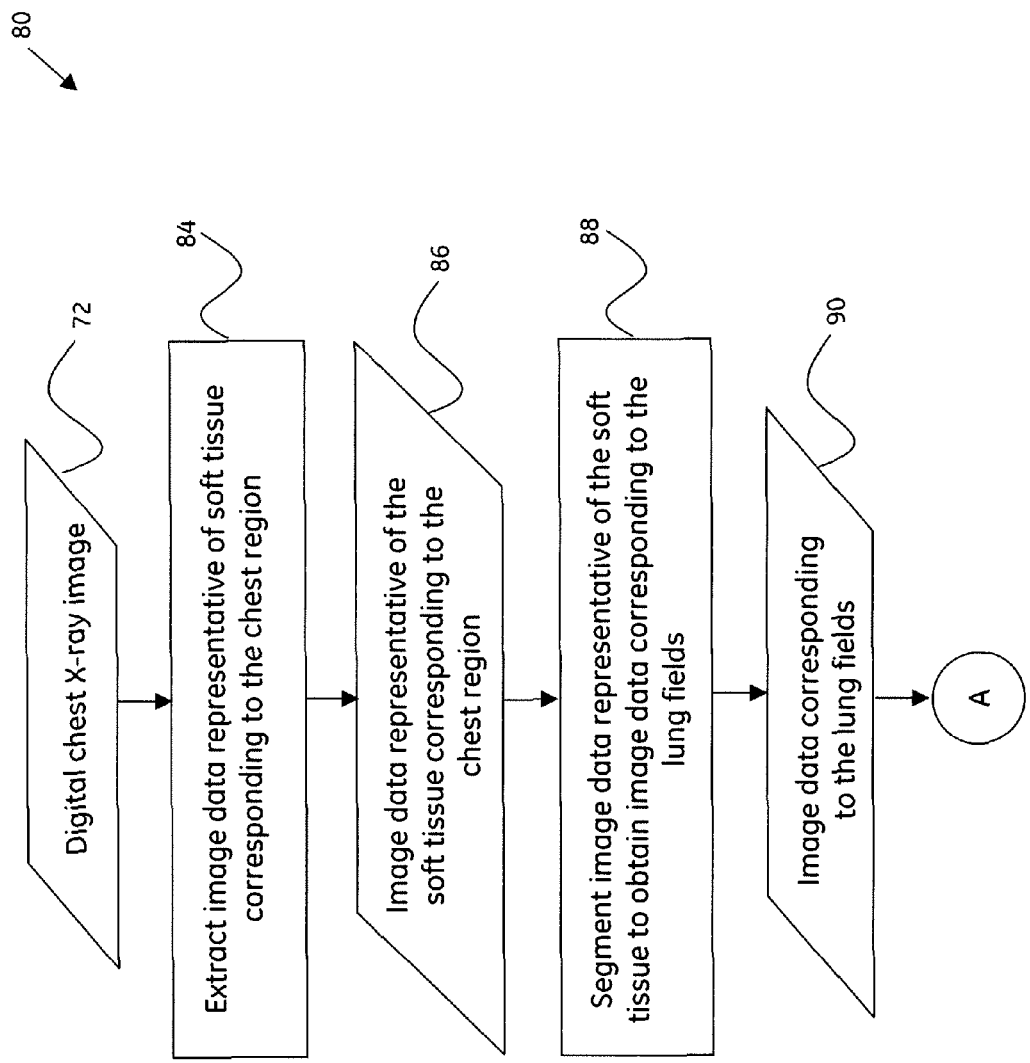
FIGS. 4A-4B are flow charts illustrating an exemplary process of delineating vasculature associated with a region of interest in an anatomical region in a patient, in accordance with aspects of the present technique.
Figure 4B:
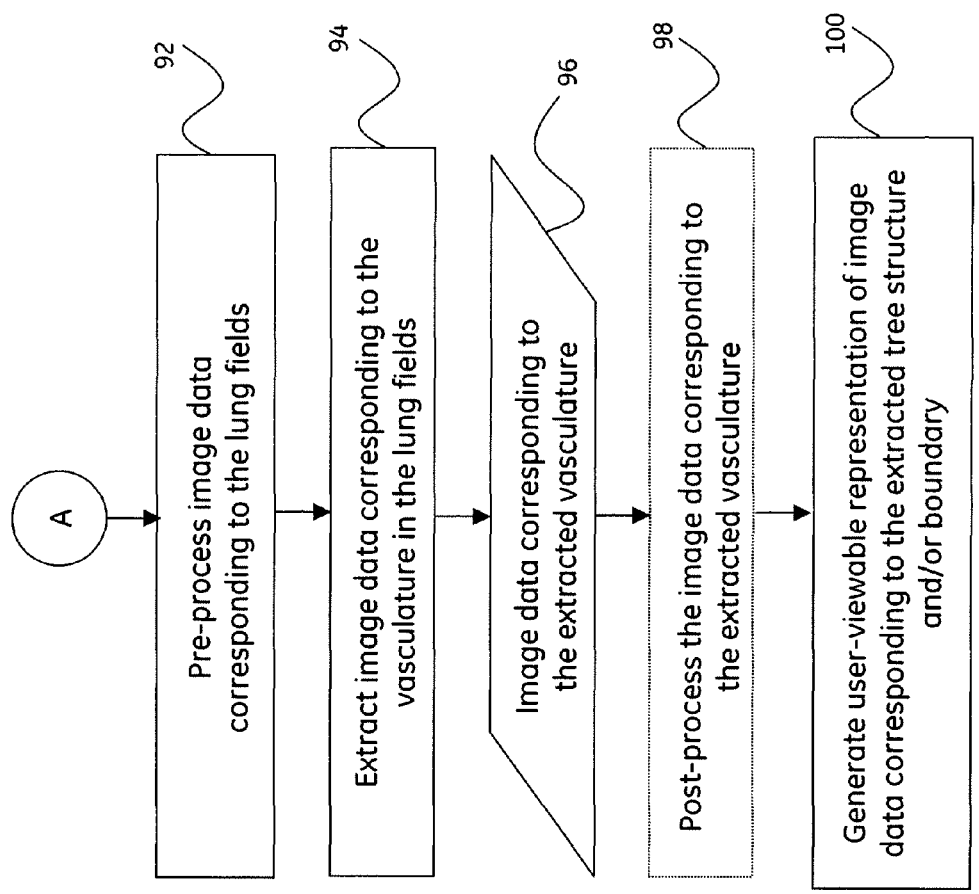

Turning now to FIG. 3, a block diagram 70 of one embodiment of the diagnostic system 10 of FIG. 1 is depicted. As previously noted with reference to FIG. 1, the acquisition subsystem 18 (see FIG. 1) is configured to aid in the acquisition of image data from the patient 12 (see FIG. 1). Also, as will be appreciated, one or more images representative of the patient 12 may be acquired by the acquisition subsystem 18. In certain embodiments, the one or more images may include digital X-ray images 72. It may be noted that the digital X-ray images 72 may be representative of an anatomical region in the patient 12. For instance, in the example illustrated in FIG. 3, the digital X-ray images 72 may include digital X-ray image data representative of a chest region of the patient 12.

Also, as noted with reference to FIG. 1, image data may be acquired by the acquisition subsystem 18. The acquired images may be stored in the data repository 28 (see FIG. 1). In certain embodiments, the data repository 28 may include a local database. The vasculature delineation platform 22 (see FIG. 1) may then access these images, such as the digital chest X-ray images 72, from the local database 28. Alternatively, the digital X-ray images 72 may be obtained by the acquisition subsystem 18 from an archival site, a database, or an optical data storage article. For example, the acquisition subsystem 18 may be configured to acquire images stored in the optical data storage article. It may be noted that the optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format. Further, these digital X-ray images 72 so acquired by the acquisition subsystem 18 may be stored locally on the medical imaging system 16 (see FIG. 1). The digital X-ray images 72 may be stored in the local database 28, for example.

Furthermore, as previously noted with reference to FIG. 1, the processing subsystem 20 (see FIG. 1) is configured to process these digital X-ray images 72, thereby aiding the clinician in identifying disease states, assessing need for treatment, determining suitable treatment options, and/or monitoring the effect of treatment on the disease states. More particularly, the processing subsystem 20 may be configured to aid in the delineation of vasculature in one or more anatomical regions in the patient 12. As previously noted, as used herein, the processing subsystem 20 may be configured to aid in the delineation of image data representative of the vasculature in one or more anatomical regions in the patient 12. Also, in the embodiments illustrated in FIGS. 1-2, the processing subsystem 20 is shown as including the vasculature delineation platform 22, where the vasculature delineation platform 22 is configured to aid in the delineation of the vasculature of the anatomical region from the surrounding background by employing the acquired X-ray images 72, as previously described. However, the vasculature delineation platform 22 may also be used as a standalone module that is physically separate from the processing subsystem 20 and the imaging system 16. In other words, the vasculature delineation platform 22 may be operationally coupled to the imaging system 16 and configured to aid in delineating the vasculature associated with the anatomical region in the patient 12 using the digital X-ray images 72 acquired by the imaging system 16, and more particularly by the acquisition subsystem 18.

In one embodiment, the vasculature delineation platform 22 may include a demarcating module 74 and an extracting module 76. In accordance with exemplary aspects of the present technique, the demarcating module 74 may be configured to demarcate a region of interest in the anatomical region of the patient 12 (see FIG. 1). Here again, as used herein, the terms demarcate a region of interest in the anatomical region of the patient 12 refers to the demarcation of image data representative of the region of interest in the anatomical region of the patient 12. By way of example, it may be desirable to delineate vasculature in the lungs of the patient 12 using image data in the digital X-ray image 72, where the digital X-ray image 72 may be representative of the chest region. Hence, it may be desirable to separate image data representative of the lungs in the patient 12 from the surrounding background, such as the anterior and posterior ribs, the backbone, and the like.

According to aspects of the present technique, the demarcating module 74 may be configured to extract soft tissue representative of the chest region from the surrounding background using the image data in the digital chest X-ray image 72. In other words, the demarcating module 74 may be configured to extract image data corresponding to soft tissue representative of the chest region from the surrounding background using the image data in the digital chest X-ray image 72. In addition, the demarcating module 74 may be configured to segment the extracted soft tissue to obtain the lung fields. Here again, the demarcating module 74 may be configured to segment image data representative of the extracted soft tissue to obtain the lung fields. More particularly, the demarcating module 74 may be configured to segment the extracted soft tissue based upon a patient population to identify a boundary of the lungs or lung fields. It may be noted that the terms lungs, lung fields, and right and left lung may be used interchangeably. In other words, the demarcating module 74 may be configured to identify the boundary of the lung fields based upon one or more parameters associated with a patient, such as the patient 12. More particularly, it may be desirable for a user of the system 40, such as a clinician, to identify a patient type. In one embodiment, the patient type may include a large adult patient, a medium adult patient, a small adult patient, or a pediatric patient. The demarcating module 74 may also be configured to obtain one or more parameters associated with the selected patient type. The one or more patient parameters may include a scaling ratio, a deviation ratio, an orientation deviation ratio, a noise threshold, combinations thereof, or the like. In accordance with exemplary aspects of the present technique, the demarcating module 74 may be configured to identify the boundary of the lung fields by optimizing the one or more parameters. The working of the demarcating module 74 will be described in greater detail with reference to FIGS. 4-9.

Subsequent to the processing by the demarcating module 74, the boundary of the lung fields may be obtained, where the boundary may be configured to aid in demarcating the lung fields from the surrounding background. In other words, consequent to processing by the demarcating module 74, a boundary of the lung fields may be identified. This identified boundary of the lung fields may then be employed to aid in the extraction of the soft tissue representative of the lung fields.

In accordance with further aspects of the present technique, the clinician may be allowed to select a region of interest to facilitate demarcation of the region of interest in the anatomical region. More particularly, the clinician may select a region of interest in the anatomical region via use of the display (see FIG. 1) and the user interface 26 (see FIG. 1). In one embodiment, the clinician may select the region of interest by drawing an outline around the region of interest on a digital X-ray image that is displayed on the display 24 via use of the user interface 26. In certain other embodiments, the clinician may select the region of interest by directly drawing an outline on the digital X-ray image displayed on the display 24.

As will be appreciated, the extracted soft tissue may also include the vasculature in the lung fields. It may be noted that the terms vasculature in the lung fields and pulmonary vasculature may be used interchangeably. Furthermore, as noted hereinabove, it may be desirable to extract the vasculature in the lung fields from the soft tissue. The extracted vasculature may then be employed to aid the clinician in the detection and/or diagnosis of disease states, if any. Accordingly, the extracting module 76 may be configured to facilitate the extraction of the vasculature in the lung fields from the surrounding soft tissue. More particularly, the extracting module 76 may be configured to facilitate the extraction of image data representative of the vasculature in the lung fields from the image data representative of the surrounding soft tissue. In accordance with exemplary aspects of the present technique, the extracting module 76 may be configured to facilitate the extraction of the vasculature in the lung fields by suppressing the soft tissue representative of the lung fields via use of a bank of parameter based filters. More particularly, the extracting module 76 may be configured to suppress the soft tissue by evaluating a frequency of each pixel in the image data representative of the lung fields at a predetermined image data resolution, a predetermined image data orientation, or a combination thereof. The extracting module 76 may also be configured to identify an energy component corresponding to the frequency of each pixel. The process of evaluating a frequency of each pixel and the identification of the corresponding energy component may then be repeated at one or more image data resolutions, one or more image orientations, or combinations thereof.

Consequent to this processing, energy components corresponding to each image pixel associated with each of the one or more image data resolutions, one or more image orientations, or combinations thereof may be obtained. The extracting module 76 may further be configured to blend the energy components associated with the different image data resolutions and/or image orientations corresponding to each image pixel to generate a blended energy component associated with each image pixel. Additionally, the extracting module 76 may also be configured to generate a blended energy image using the blended energy components associated with each image pixel.

In accordance with further aspects of the present technique, the extracting module 76 may also be configured to apply a predetermined threshold to the blended energy image to extract image data corresponding to the pulmonary vasculature. More particularly, the extracting module 76 may be configured to apply the predetermined threshold to the blended energy image to delineate image data corresponding to the vasculature or vascular tree from image data corresponding to the non-tree structures, thereby obtaining image data corresponding to vasculature in the region of interest. Moreover, the extracting module 76 may be configured to generate a user-viewable representation of the delineated vascular tree structure in the lung fields, the boundary of the lung fields, or both. The working of the extracting module 76 will be explained in greater detail with reference to FIGS. 4-9. Consequent to such processing by the vasculature delineation platform 22, the vasculature in the lung fields may be delineated from the surrounding background and displayed to the clinician, for example.

Furthermore, the vasculature delineation platform 22 may also be configured to provide a visual interface to the vasculature in the lung fields. In one embodiment, the vasculature delineation platform 22 may be configured to display the extracted vasculature, the identified boundary of the lung fields, or both. The extracted vasculature and/or the boundary of the lung fields may be visualized on the display 24 (see FIG. 1), in certain embodiments. This display of the extracted vasculature may advantageously aid the clinician in detection and/or diagnosis of any anomalies in the pulmonary vasculature of the patient 12. Moreover, the user interface 26 (see FIG. 1) may be utilized to manipulate the visualization of the extracted vasculature. Additionally, information corresponding to the extracted vasculature may be stored in a second storage 78.

The working of the vasculature delineation platform 22 (see FIG. 1) may be better understood with reference to the exemplary logic depicted in FIGS. 4-9. Referring now to FIGS. 4A-4B, a flow chart of exemplary logic 80 for delineation of vasculature in an anatomical region is illustrated. In accordance with exemplary aspects of the present technique, a method for delineation of vasculature in the anatomical region is presented. In other words, a method for automatic delineation of image data corresponding to the vasculature from the image data corresponding to the anatomical region is presented. In the example presented in FIG. 4, a method for automatic delineation of pulmonary vasculature in the lung fields using digital X-ray image data is presented. Additionally, as previously noted, X-ray radiographs representative of the chest region may also be employed to aid in the delineation of the pulmonary vasculature. However, it is desirable that the X-ray radiograph is digitized and subject to one or more pre-processing steps apriori.

The method starts at step 84 where image data 72 representative of an anatomical region is obtained. In the present example, the method for delineation of vasculature is described in terms of delineation of vasculature in lung fields in the chest region of a patient, such as the patient 12 (see FIG. 1). Accordingly, the image data 72 may include a digital X-ray of the chest region of the patient 12. Further, at step 84, the image data corresponding to soft tissue representative of the chest region may be obtained. In accordance with aspects of the present technique, obtaining the image data corresponding to the soft tissue representative of the chest region may include separating the image data corresponding to the soft tissue representative of the chest region from image data corresponding to the surrounding background. The surrounding background may include the anterior and posterior ribs, and the backbone, for example. In one embodiment, a dual energy method may be employed to separate the image data corresponding to the soft tissue representative of the chest region from the image data corresponding to the surrounding background. By employing the dual energy technique, interference of the rib structures may be substantially reduced via use of digital image subtraction. Other techniques configured to aid in the separation of the image data corresponding to the soft tissue representative of the chest region from the surrounding background, such as, but not limited to, model based techniques or learning based techniques may also be used. Consequent to the processing by step 84, image data corresponding to the soft tissue representative of the chest region 86 may be obtained.

Subsequently, at step 88, the image data corresponding to the soft tissue representative of the anatomical region may be processed to segment a region of interest from the anatomical region. In other words, the image data corresponding to the soft tissue representative of the anatomical region may be processed to obtain image data corresponding to a segmented region of interest. More particularly, in accordance with exemplary aspects of the present technique, the image data corresponding to the segmented region of interest may be segmented from the image data corresponding to the soft tissue representative of the anatomical region by processing the image data representative of the soft tissue corresponding to the anatomical region based upon a patient population. In the present example, the image data corresponding to the soft tissue representative of the chest region may be processed to segment out image data corresponding to the left and right lungs. In other words, the segmented region of interest may include the left and right lungs. It may be noted that the terms lungs, left and right lungs, and lung fields may be used interchangeably. Also, consequent to processing by step 88, image data corresponding to the lung fields 90 may be obtained. Step 88 may be better understood with reference to FIGS. 5-6.

Referring now to FIG. 5, a flow chart 110 illustrating step 88 of FIG. 4 is depicted. More particularly, an exemplary method of processing the image data corresponding to the soft tissue representative of the chest region to obtain the image data corresponding to the segmented region of interest, such as the lung fields, is depicted. In accordance with aspects of the present technique, the image data corresponding to the soft tissue representative of the chest region may be processed to segment the image data corresponding to the lung fields based upon a patient population, as indicated by step 112. Step 112 may be better understood with reference to FIG. 6.

Figure 6:
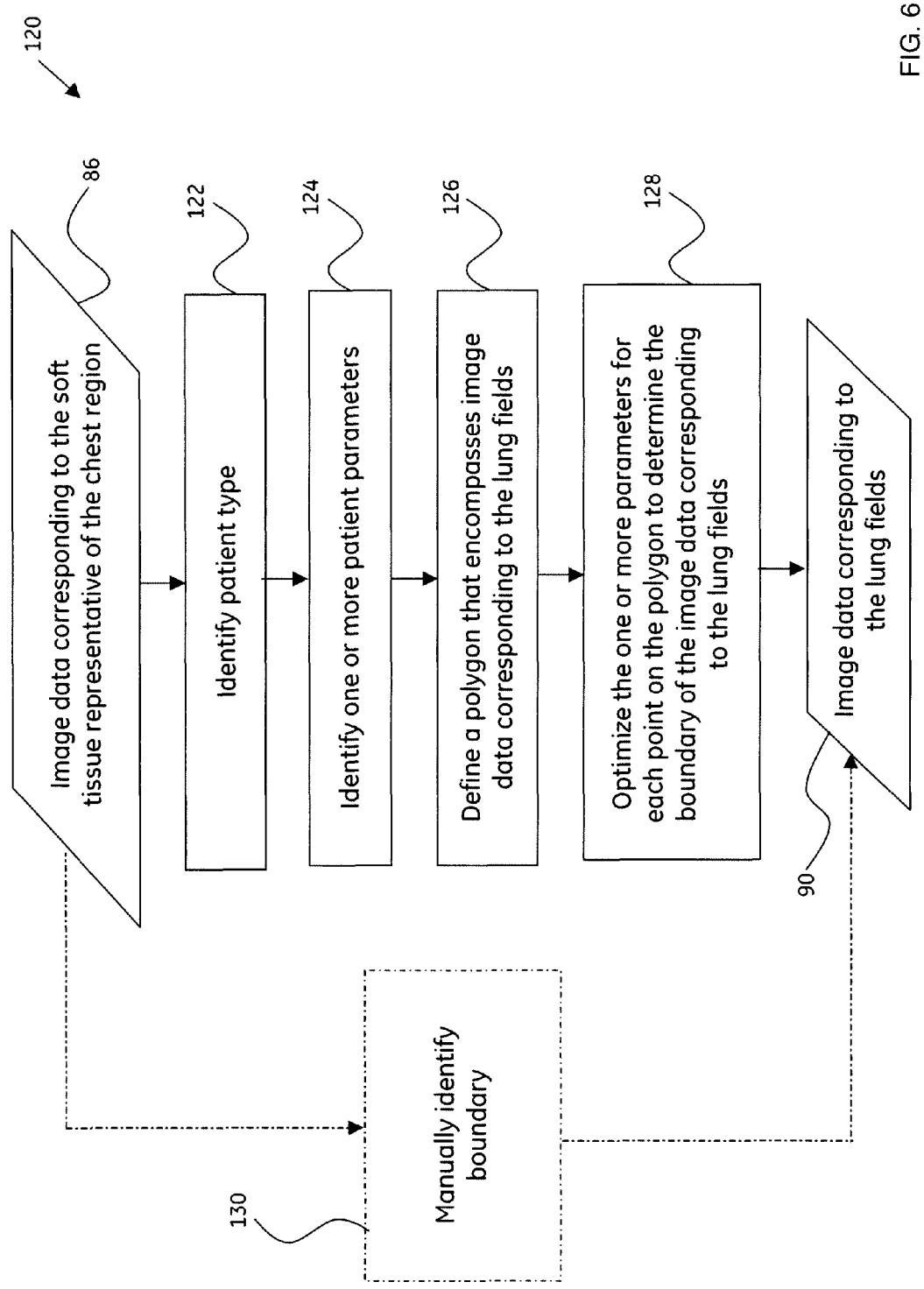
FIG. 6 is a flow chart illustrating an exemplary process of FIG. 5 of segmenting the soft tissue by processing image data based upon a patient population to identify a boundary of lung fields in a patient, in accordance with aspects of the present technique.

FIG. 6 is a flow chart 120 depicting step 112 of FIG. 5. An exemplary method for segmenting a region of interest from the soft tissue representative of an anatomical region based upon a patient population is depicted in FIG. 6. More particularly, a method for segmenting image data representative of a region of interest from image data corresponding to the soft tissue representative of an anatomical region based upon a patient population is presented. In other words, one or more parameters associated with a patient type may be optimized to aid in identifying a boundary of the region of interest to facilitate segmentation of the region of interest. As previously noted, in the present example, the anatomical region includes the chest region, while the region of interest may include the lung fields. The method starts at step 122, where once the soft tissue representative of the chest region 86 is obtained, a patient type may be identified. In accordance with aspects of the present technique, the patient type may include a large adult patient, a medium adult patient, a small adult patient, or a pediatric patient. Subsequent to the selection of the patient type, one or more patient parameters associated with the selected type may be identified, as indicated by step 124. The patient parameters may include a scaling ratio, a deviation ratio, an orientation deviation ratio, a noise threshold, combinations thereof, or the like. These patient parameters may be optimized to facilitate identification of the boundary of the lung fields, thereby allowing segmentation of the image data corresponding to the region of interest from the image data corresponding to the anatomical region.

Accordingly, at step 126, a polygon configured to encompass the region of interest may be defined, where the polygon may be configured to facilitate the segmentation of the region of interest. In other words, a polygon configured to encompass the lung fields may be defined. More particularly, the define polygon may be configured to encompass image data corresponding to the lung fields. The polygon may include a square, a rectangle, or the like, for example. Subsequently, at step 128, for each point on the polygon, the one or more patient parameters may be optimized to aid in determining the boundary of the lung fields. Accordingly, a point on the polygon may be selected. The patient parameters may then be modified in order to optimize the values of the patient parameters. In one embodiment, the patient parameters may be modified for convergence of an error energy function. It may be noted that a predetermined optimum range may be defined for each of the patient parameters. By way of example, an optimal range of patient parameters for a large adult may be in a range from about 0.1 to about 0.2, while an optimal range of patient parameters for a medium adult may be in a range from about 0.02 to about 0.09. Similarly, for a small adult patient, an optimal range of patient parameters may be in a range from about 0.01 to about 0.02, while an optimal range of patient parameters for a pediatric patient may be in a range from about 0.001 to about 0.01.

Hence, for a given point on the polygon, the patient parameters may be modified such that each of the patient parameters conforms to a corresponding predetermined optimum range. Once each of the patient parameters corresponding to the given point on the polygon has been optimized, a point on a boundary of the lung fields may be identified. The above process may be repeated for each point on the polygon. Consequent to the above processing, the boundary of the lung fields may be identified. In other words, the region of interest, namely the lung fields, may be segmented from the anatomical region, namely the chest region. More particularly, image data corresponding to the region of interest may be segmented out from image data corresponding to the anatomical region. Consequent to the processing by step 128, image data representative of the lung fields 90 (see FIG. 4) may be segmented from image data corresponding to the chest region. In other words, the boundaries of each of the left lung and the right lung may be identified consequent to the processing by step 128. More particularly, contours of the lung fields may be obtained by optimizing the patient parameters for convergence of the error energy function.

Alternatively, instead of the processing of steps 122-128, a clinician may manually identify a boundary of a region of interest in an anatomical region in the patient 12, as indicated by step 130. In the present example, the clinician may identify the boundary of the lung fields by drawing on the digital X-ray image of the chest region displayed on the display 24 (see FIG. 1). Also, the clinician may use the user interface 26 (see FIG. 1) to identify the boundary the lung fields. Subsequent to the identification of the boundary by the clinician, image data corresponding to the lung fields 90 may be obtained.

With returning reference to FIG. 4, image data corresponding to the segmented lung fields 90 may then be pre-processed, as depicted in step 92. In certain embodiments, the image data corresponding to the segmented lung fields 90 may be pre-processed to facilitate minimization of noise associated with the image data. Subsequently, at step 94, the image data associated with the segmented lung fields 90 may be further processed to facilitate extraction of image data corresponding to vasculature in the lung fields 90. Consequent to processing by step 94, image data corresponding to the extracted vasculature may be obtained. This image data corresponding to the extracted vasculature may generally be represented by reference numeral 96. Step 94 may be better understood with reference to FIG. 7.

As noted hereinabove with reference to FIG. 4, subsequent to processing by steps 88-92, image data representative of soft tissue corresponding to the lung fields 90 may be obtained. It may be noted that the pulmonary vasculature may be embedded in the soft tissue corresponding to the lung fields 90. Hence, it may be desirable to extract the pulmonary vasculature from the soft tissue. In other words, it may be desirable to extract image data corresponding to the pulmonary vasculature from the image data corresponding to the soft tissue representative of the region of interest.

Figure 7:
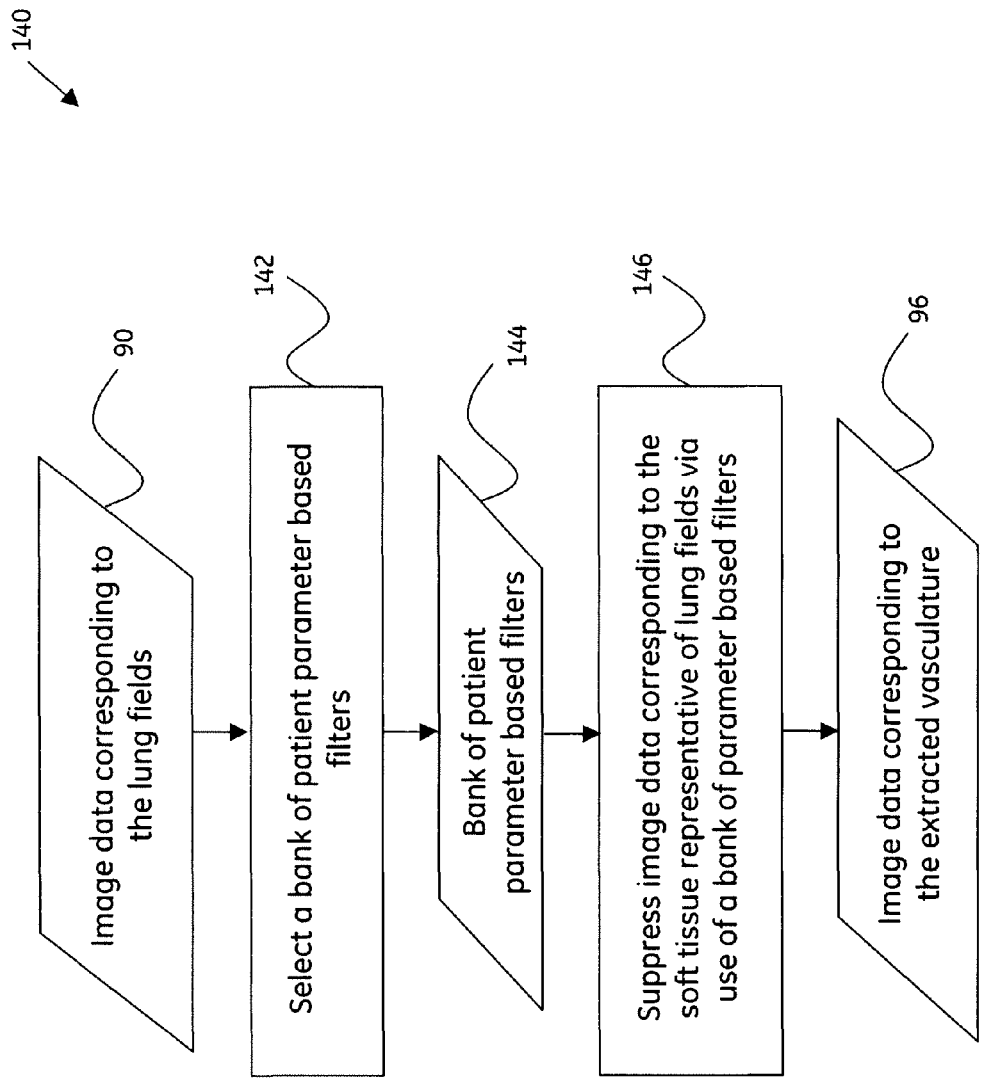
FIG. 7 is a flow chart illustrating an exemplary process of extracting vasculature in the lung fields, in accordance with aspects of the present technique.
Figure 9A:
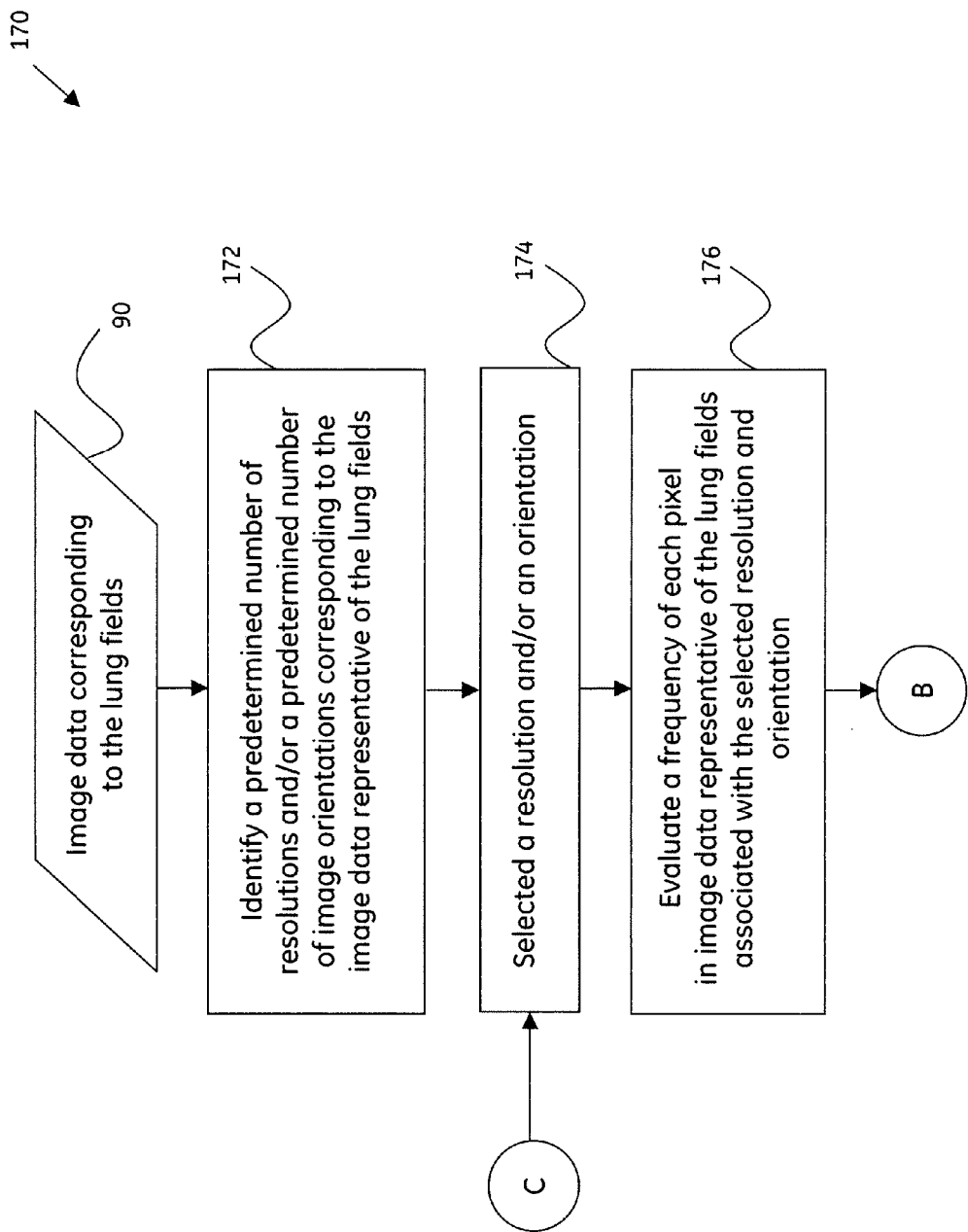
FIGS. 9A-9D are flow charts illustrating an exemplary process of extracting vasculature in the lung fields by suppressing soft tissue representative of the lung fields via use of a bank of patient parameter based filters, in accordance with aspects of the present technique.
Figure 9B:
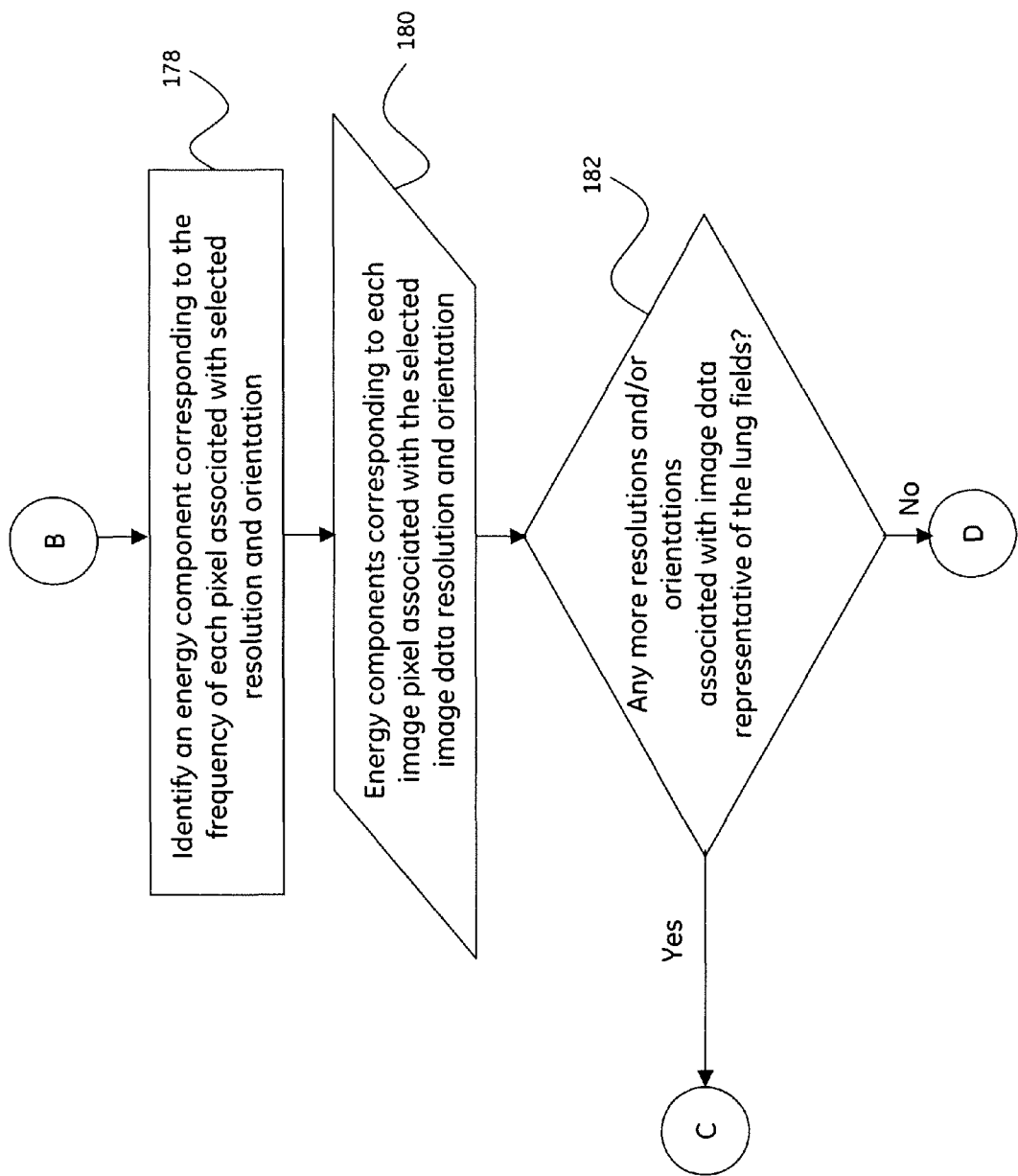
Figure 9C:
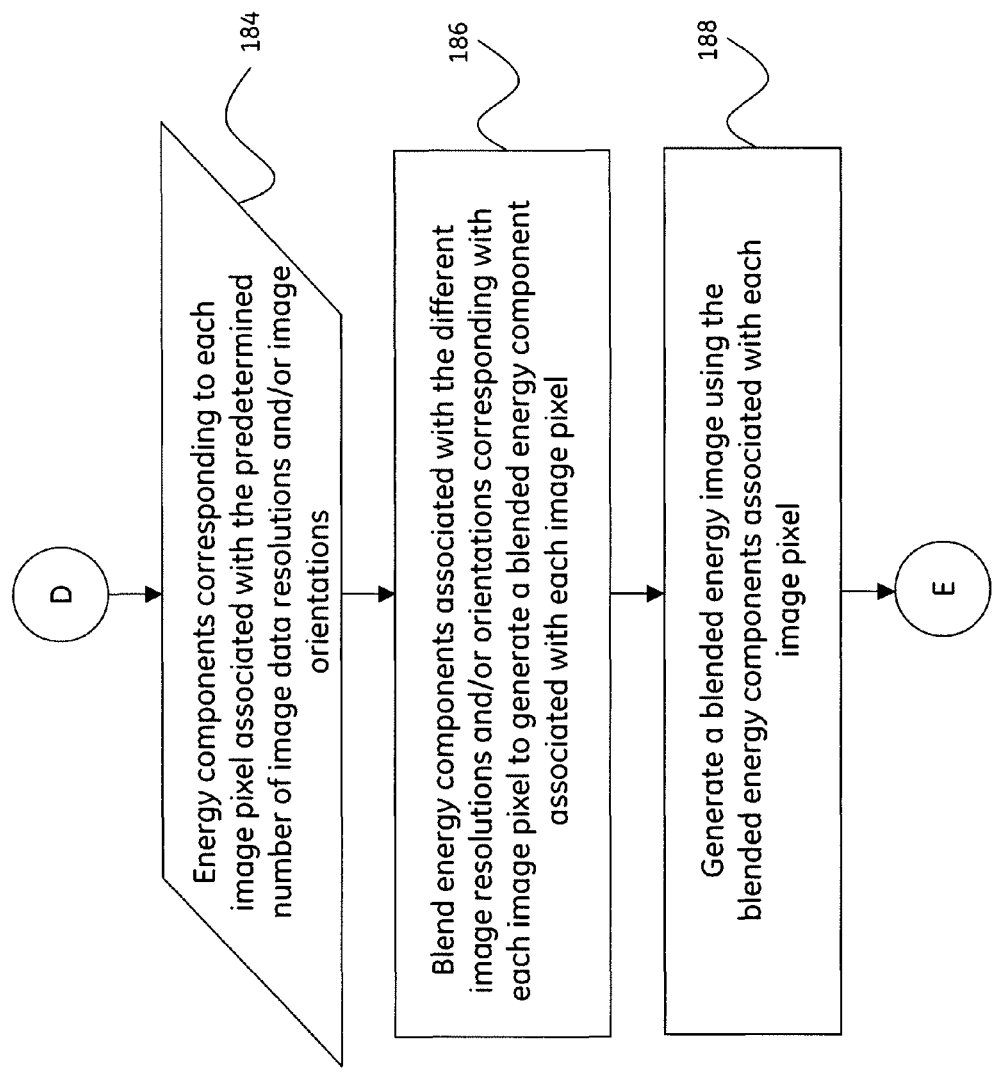
Figure 9D:
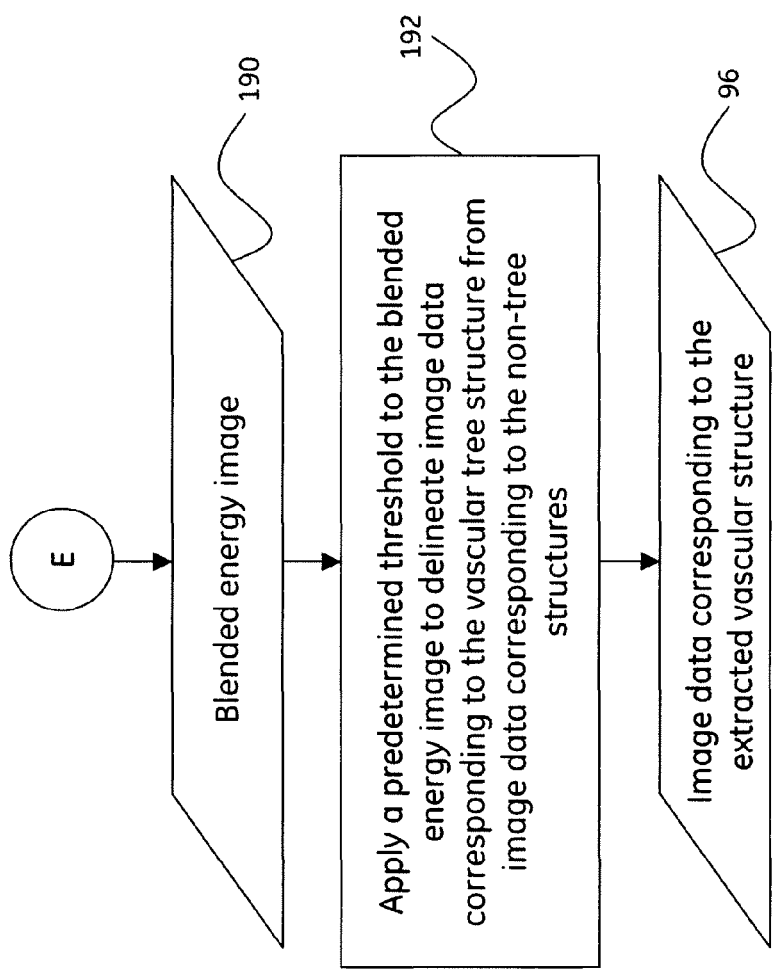

Turning now to FIG. 7, a flow chart 140 illustrating step 94 of FIG. 4 is presented. More particularly, a method for extracting vasculature in a segmented region of interest from the soft tissue associated with the segmented region of interest, such as the lung fields 90 (see FIG. 4), is depicted in FIG. 4. In other words, a method for extracting image data corresponding to vasculature in a segmented region of interest from image data corresponding to the soft tissue associated with the segmented region of interest is presented. In accordance with exemplary aspects of the present technique, the method for extracting vasculature in the lung fields may be based upon a frequency symmetry analysis of two-dimensional (2D) feature vectors obtained at all the points in an image plane, as most of vascular structures in the lung fields are typically thin elongated tubular structures with localized frequencies. In other words, the image data corresponding to the vasculature in the lung fields may be extracted by suppressing the image data corresponding to the soft tissue associated with the lung fields. More particularly, one or more groups of filters may be designed based upon one or more patient parameters to aid in the suppression of the image data corresponding to the soft tissue associated with the lung fields, as depicted by step 142. In one embodiment, the filters may include a Gabor filter. Additionally, a bank of filters, where the bank of filters may include the one or more groups of filters may be designed by optimally selecting the filter parameters, such as the patient parameters. The one or more patient parameters may include a scaling ratio, a deviation ratio, an orientation deviation ratio, a noise threshold, or the like. Here again, the patient parameters may be associated with a patient type, where the patient type may include a large adult patient, a medium adult patient, a small adult patient, or a pediatric patient. The bank of patient parameter based filters so selected at step 142 may generally be represented by reference numeral 144.

Referring now to FIG. 8, one example of a table 150 of patient parameters associated with one or more patient types is illustrated. Reference numeral 152 may be indicative of a patient parameter, while reference numerals 154-160 may generally be representative of patient types. More particularly, reference numeral 154 may be representative of a large adult patient type, while a medium adult patient type may be represented by reference numeral 156. In a similar fashion, a small adult patient type may be represented by reference numeral 158, while reference numeral 160 may be indicative of a pediatric patient. Further, reference numeral 162 may be indicative of optimum values of the different patient parameters corresponding to the various patient types 154-160.

With returning reference to FIG. 7, subsequently, at step 146, this bank of patient parameter based filters 144 may be employed to aid in suppressing the image data corresponding to the soft tissue associated with the lung fields, thereby facilitating extraction of the image data corresponding to the vasculature in the lung fields. As noted hereinabove, typically the pulmonary vasculature includes thin elongated tubular structures with localized frequencies. Accordingly, the filters in the bank of patient parameter based filters 144 may be selected to aid in the extraction of desired local frequencies. Step 146 may be better understood with reference to FIG. 9.

Referring now to FIGS. 9A-9D, a flow chart 170 depicting step 146 of FIG. 7 is illustrated. An exemplary method for extracting the vasculature in the lung fields 90 (see FIG. 4) via suppression of the soft tissue associated with the lung fields 90 is presented. In other words, a method for extracting image data corresponding to the vasculature in the lung fields 90 (see FIG. 4) via suppression of the image data representative of the soft tissue associated with the lung fields 90 is presented. More particularly, the bank of patient parameter based filters 144 (see FIG. 7) may be employed to aid in the suppression of the soft tissue associated with the lung fields 90, thereby facilitating the extraction of the pulmonary vasculature in the lung fields. The method for extracting vasculature in the lung fields of step 146 may be configured to include distinguishing a tree structure from non-tree structures in the lung fields 90 (see FIG. 4). More particularly, in accordance with exemplary aspects of the present technique, image data corresponding to the tree structure in the vasculature may be differentiated from image data corresponding to the non-tree structures in the vasculature in the lung fields 90 via use of a bank of patient parameter based filters. In other words, the image data corresponding to the tree structure may be differentiated from the image data corresponding to the non-tree structures by suppressing image data corresponding to the soft tissue representative of the lung fields via use of the bank of parameter based filters, as indicated by step 146. More particularly, the image data corresponding to the vascular tree structure may be separated from the image data corresponding to the non-tree structures based on energy levels.

As noted hereinabove, the image data corresponding to the soft tissue associated with the lung fields may be suppressed via use of the bank of patient parameter based filters 144 (see FIG. 7). More particularly, the filters in the bank of patient parameter based filters 144 may be employed to aid in the computation of desired local frequencies. In accordance with aspects of the present technique, the pulmonary vascular structures may be approximated as piece-wise linear structures, which exhibit high angle symmetry with equally significant maximal value of local energy if the corresponding points of vessel fall on an edge plane. In addition, the local energy may be computed from spectrums of different scales of frequencies and/or orientations by incorporating further noise compensation.

Accordingly, a predetermined number of image data resolutions corresponding to the image data representative of the lung fields may be selected, as indicated by step 172. Additionally, at step 172, a predetermined number of image orientations corresponding to the image data representative of the lung fields may also be selected. Subsequently, at step 174, one image resolution, one image orientation, or a combination thereof may be respectively selected from the predetermined number of image resolutions and the predetermined number of image orientations. A frequency of each pixel in the image data representative of the lung fields associated with the selected image resolution and/or image orientation may be computed, as depicted by step 176. Additionally, at step 178, an energy component corresponding to the frequency of each image pixel may also be identified. Consequent to processing by steps 176-178, energy components 180 corresponding to each image pixel associated with the selected image data resolution and/or image orientation may be obtained.

Moreover, the processing of steps 176-178 may be repeated for each of the predetermined image data resolutions and/or image orientations. Accordingly, at step 182, a check may be carried out to verify if the processing of steps 176-178 has been applied to each of the predetermined image data resolutions and/or image orientations. At step 182, if it is verified that that there exists one or more image resolutions and/or one or more image orientations that have not been applied to the image data, then control may be returned to step 174. In other words, another image resolution and/or image orientation may be respectively selected from the predetermined sets of image data resolutions and image orientations and steps 176-178 may be applied to the image data at the currently selected image data resolution and/or image orientation. In other words, a frequency of each pixel in the image data representative of the lung fields associated with the currently selected image data resolution and/or image orientation may be computed.

Additionally, an energy component corresponding to the frequency of each pixel associated with the selected image data resolution and/or image resolution may be identified. In other words, the processing of steps 176-178 may be repeated for all the image data resolutions and image orientations. However, at step 182, if it is verified that each of the predetermined image data resolutions and/or image orientations have been considered, energy components corresponding to each image pixel associated with each of the predetermined number of image data resolutions and/or image orientations may be obtained. These energy components may generally be represented by reference numeral 184. It may be noted that, in one embodiment, the processing may be initiated with a relatively low image data resolution and subsequently, image data resolutions having relatively higher resolutions may be selected.

In accordance with further aspects of the present technique, a local energy associated with each image pixel at each of the predetermined image data resolutions and/or image orientations may be computed. Accordingly, at step 186, for each image pixel, energy components associated with each of the predetermined number of image data resolutions and/or image orientations may be blended to generate a blended energy component associated with each image pixel. Consequent to processing by step 186, blended energy components associated with each image pixel may be obtained. Subsequently, at step 188, these blended energy components may be employed to generate a blended energy image 190.

Once the blended energy image 190 is generated, this blended energy image 190 may be employed to aid in the extraction of the vasculature in lung fields. In other words, the blended energy image 190 may be used to delineate the vascular tree structure from the non-tree structures in the lung fields 90. Accordingly, at step 192, a predetermined threshold may be applied to the blended energy image 190 to delineate the vascular tree structure from the non-tree structures. In one embodiment, an adaptive threshold may be employed to aid in the delineation of the vasculature in the lung fields from the surrounding non-tree structures. Consequent to processing by step 192, image data corresponding to the delineated vasculature or vascular tree structure 96 (see FIG. 4) may be obtained. In other words, the image data corresponding to the delineated vasculature 96 associated with the lung fields may be obtained, where the delineated vasculature includes the vessel segments in lung fields. It may be noted that the terms delineated vasculature or vascular structure and extracted vasculature or vascular structure may be used interchangeably.

With returning reference to FIG. 4, subsequently, the image data corresponding to the delineated vascular tree 96 may be subject to one or more post-processing steps, as depicted by step 98. In one embodiment, a technique, such as an edge link technique, may be applied to the image data corresponding to the delineated vascular structure 96 to facilitate connection of any disjointed vasculature, for example. Alternatively, in certain other embodiments, a region growing process and/or a three-dimensional (3D) connectivity process may be applied to connect any disjointed vasculature.

Furthermore, the image data corresponding to the delineated vasculature 96 may be presented to the clinician, as indicated in step 100. More particularly, a user-viewable representation of the extracted vasculature 96 may be generated and presented to the clinician on the display 24 (see FIG. 1), for example. In addition, the boundary of the lung fields may also be presented to the clinician. Furthermore, a composite image including the extracted vasculature 96 and the boundary of the lung fields may also be presented to the clinician.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The method of automatically delineating image data corresponding to vasculature in an anatomical region and the system for automatically delineating image data corresponding to vasculature in an anatomical region described hereinabove dramatically simplify procedural workflow for the detection of disease states in the vasculature of an anatomical region in the patient and enhance the speed of procedural time taken to detect and/or diagnose the presence of disease states in the vasculature of the anatomical region. In other words, the method and system for the automatic delineation of image data corresponding to the vasculature in the anatomical region may be configured to facilitate an enhanced visualization of the delineated vasculature. This visualization of the delineated vasculature may be employed to facilitate quantitative measurement of vascular dimension, which may greatly aid in quantification of normal and/or abnormal region of interest in the anatomical region. More particularly, an enhanced visualization of vascular abnormalities may be provided to the clinician, thereby enhancing clinical diagnostic workflow. Moreover, the delineated vascular structures may be used as landmarks in tumor resection planning. Additionally, the delineation of image data corresponding to the vasculature in the anatomical region may be configured to aid in the quantification of volumetric coronary blood flow. Also, angiogenesis may be better understood using the delineated pulmonary vessels. Furthermore, the automatic delineation of image data corresponding to the vasculature aids in the identification of obstructions in the vasculature with a reduced false-positive rate, which facilitates a radiologist or physician to interpret the images and detect suspect regions that may indicate disease.

The above-description of the embodiments of the system for automatic delineation of image data corresponding to vasculature in an anatomical region and the method for automatic delineation of image data corresponding to vasculature in an anatomical region have the technical effect of enhancing clinical workflow by providing the clinician with an enhanced visualization of the delineated vasculature in the anatomical region, thereby facilitating better detection and/or diagnosis of disease states in the anatomical region.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for automatically delineating image data corresponding to vasculature in an anatomical region, the method comprising:
   obtaining, by an image acquisition device, image data corresponding to soft tissue representative of the anatomical region;
   segmenting, by a demarcation module of a system controller, image data corresponding to a region of interest from image data corresponding to the anatomical region based on a patient population to obtain image data corresponding to a segmented region of interest;
   selecting a bank of patient parameter based filters based on a patient type and at least one patient parameter corresponding to the patient type, wherein the patient type comprises one of a large adult patient, a medium adult patient, a small adult patient, and a pediatric patient, and wherein the at least one patient parameter comprises at least one of a scaling ratio, a deviation ratio, an orientation deviation ratio, and a noise threshold;
   extracting, by an extracting module of the system controller, image data corresponding to vasculature associated with the segmented region of interest by using the selected bank of patient parameter based filters to aid in suppressing image data corresponding to soft tissue representative of the segmented region of interest.

2. The method of claim 1, further comprising obtaining image data from a data source, wherein the image data is representative of the anatomical region, wherein the data source comprises a data stream or archived data, and wherein the archived data is obtained from a first storage, and wherein the data source comprises an imaging system, and wherein the imaging system is an X-ray imaging system.

3. The method of claim 1, wherein obtaining image data corresponding to soft tissue representative of the anatomical region comprises separating the obtained image data from surrounding background.

4. The method of claim 1, wherein segmenting image data corresponding to the region of interest from image data corresponding to the anatomical region comprises processing the image data representative of the anatomical region based on the patient population to identify a boundary of the segmented region of interest by optimizing one or more parameters associated with the patient population.

5. The method of claim 4, further comprising:
   modifying a resolution, an image orientation, or a combination thereof of the image data representative of the segmented region of interest to generate one or more sets of image data, wherein each of the one or more sets of image data has a resolution and/or orientation that is different from resolutions and/or orientations of the other one or more image data sets;
   evaluating a frequency associated with each image pixel in each of the one or more image data sets; and
   identifying an energy component corresponding to the frequency associated with each image pixel at each of the one or more resolutions, the one or more image orientations, or combinations thereof.

6. The method of claim 5, further comprising:
   blending the energy components associated with each of the one or more image data sets for each pixel to generate a blended energy component associated with that image pixel;
   generating a blended energy image using the blended energy components associated with each image pixel;
   applying a predetermined threshold to the blended energy image to delineate image data corresponding to the vascular tree structure associated with the segmented region of interest from image data corresponding to the non-tree structures in the segmented region of interest; and
   generating a user-viewable representation of image data corresponding to the delineated vascular tree structure, the boundary of the segmented region of interest, or a combination thereof.

7. A method for automatically delineating image data corresponding to vasculature in an anatomical region, the method comprising:
   obtaining digital X-ray image data representative of an anatomical region in a patient;
   obtaining image data corresponding to soft tissue representative of the anatomical region;
   segmenting image data corresponding to a region of interest from image data corresponding to the anatomical region based on a patient population to obtain image data corresponding to a segmented region of interest;
   selecting a bank of patient parameter based filters based on a patient type and at least one patient parameter corresponding to the patient type, wherein the patient type comprises one of a large adult patient, a medium adult patient, a small adult patient, and a pediatric patient, and wherein the at least one patient parameter comprises at least one of a scaling ratio, a deviation ratio, an orientation deviation ratio, and a noise threshold; and
   extracting image data corresponding to vasculature associated with the segmented region of interest by using the selected bank of patient parameter based filters to aid in suppressing image data corresponding to soft tissue representative of the segmented region of interest.

8. A delineation system, comprising:
   a delineation platform of a system controller configured to extract image data corresponding to vasculature associated with a region of interest in an anatomical region, wherein the delineation platform is configured to:
      obtain image data corresponding to soft tissue representative of the anatomical region;
      segment image data corresponding to the region of interest from image data corresponding to the anatomical region based on a patient population to obtain image data corresponding to a segmented region of interest;
      select a bank of patient parameter based filters based on a patient type and at least one patient parameter corresponding to the patient type, wherein the patient type comprises one of a large adult patient a medium adult patient, a small adult patient, and a pediatric patient, and wherein the at least one patient parameter comprises at least one of a scaling ratio, a deviation ratio, an orientation deviation ratio, and a noise threshold; and
      extract image data corresponding to vasculature associated with the segmented region of interest by using the selected bank of patient parameter based filters to aid in suppressing image data corresponding to soft tissue representative of the segmented region of interest.

9. An imaging, system, comprising:

an acquisition subsystem of a system controller configured to acquire image data from an image acquisition device, wherein the image data is representative of an anatomical region in a patient;

a processing subsystem of the system controller in operative association with the acquisition subsystem and comprising a delineation platform configured to:

obtain image data corresponding to soft tissue representative of the anatomical region;

segment image data corresponding to a region of interest from image data corresponding to the anatomical region based on a patient population to obtain image data corresponding to a segmented region of interest;

select a bank of patient parameter based filters based on a patient type and at least one patient parameter corresponding to the patient type, wherein the patient type comprises one of a large adult patient, a medium adult patient, a small adult patient, and a pediatric patient, and wherein the at least one patient parameter comprises at least one of a scaling ratio, a deviation ratio, an orientation deviation ratio, and a noise threshold; and extract image data corresponding to vasculature associated with the segmented region of interest by using the selected bank of patient parameter based filters to aid in suppressing image data corresponding to soft tissue representative of the segmented region of interest.

* * * * *

UNITED STATES PATENT AND TRADEMARK OFFICE
CERTIFICATE OF CORRECTION

PATENT NO. : 8,542,903 B2  
APPLICATION NO. : 12/547714  
DATED : September 24, 2013  
INVENTOR(S) : Shekhara Page 1 of 1

It is certified that error appears in the above-identified patent and that said Letters Patent is hereby corrected as shown below:

In the Specification

In Column 10, Lines 17-18, delete "second storage 78." and insert -- data storage 78. --, therefor.

In the Claims

In Column 18, Line 59, in Claim 8, delete "patient" and insert -- patient, --, therefor.

In Column 19, Line 3, in Claim 9, delete "imaging," and insert -- imaging --, therefor.

Signed and Sealed this  
Twenty-fourth Day of December, 2013

Margaret A. Focarino  
*Commissioner for Patents of the United States Patent and Trademark Office*